UNITED STATES PATENT OFFICE.

HEINRICH ROSE, OF HÖCHST-ON-THE-MAIN, GERMANY, ASSIGNOR TO FARB-WERKE, VORMALS MEISTER, LUCIUS & BRÜNING, OF SAME PLACE.

MANUFACTURE OF DYE-STUFF FROM ALIZARINE-BLUE.

SPECIFICATION forming part of Letters Patent No. 263,964, dated September 5, 1882.

Application filed November 14, 1881. (Specimens.) Patented in England October 18, 1881, No. 4,531.

*To all whom it may concern:*

Be it known that I, Dr. HEINRICH ROSE, of Höchst-on-the-Main, Germany, have invented a new and useful Improvement in Fixing Alizarine-Blue on Fiber, of which the following is a specification.

My invention relates to improvements in the dyeing and printing of fabrics with the alkaline salts of alizarine-blue.

The alizarine-blue to which I have reference is that compound which can be produced from nitro-alizarine by heating the same with glycerine and sulphuric acid, and the formula of which is, according to the researches of Graebe, $C_{17}H_9NO_4$.

To produce the alkaline salt of the alizarine-blue I add to the latter, suspended in water, a slight excess of an alkali or of an alkaline carbonate, and by filtering and washing I obtain the alkaline salt of the alizarine-blue in the form of a blue paste. I use these alkaline salts of alizarine-blue for dyeing and printing by adding bisulphite of the alkalies to the said salts in their application. As an example I may state that a suitable printing-color is obtained by mixing the natrium salt of alizarine-blue in paste (forty parts of a paste containing fifteen per cent. of coloring-matter) with the thickening (four hundred parts) and with bisulphite of natrium, (twelve parts in crystals;) and afterward I make the color ready for printing by adding the mordant—as, for instance, acetate of chromium oxide, (one hundred parts of a solution of 10° Baumé or 14° Twaddle.) Under these circumstances the natrium salt of the alizarine-blue dissolves quite easily, and produces on the fiber an intense and very fast color, whereas under corresponding circumstances the alizarine-blue does not dissolve, and consequently cannot be fixed sufficiently.

I wish it to be understood that I do not claim the coloring-matter consisting of a compound of an alkaline salt of alizarine-blue with alkaline bisulphites, or the method of making the same, as this is described in an application for a patent filed by me November 14, 1881, serial number 45,781.

I claim as my invention—

The herein-described dyeing or printing compound, having the properties herein set forth, and made from an alkaline salt of alizarine-blue, an alkaline bisulphite, and a mordant.

In testimony whereof I have signed my name to this specification in the presence of two subscribing witnesses.

HEINRICH ROSE.

Witnesses:
 FRANZ WIRTH,
 FRANZ HASSLACHER.